United States Patent
Todd

[11] 3,841,349
[45] Oct. 15, 1974

[54] TRICKLE RATE FLUID OUTLET

[76] Inventor: Theodore J. Todd, 1039 East Grand Blvd., Corona, Calif. 91720

[22] Filed: Mar. 17, 1972

[21] Appl. No.: 235,539

Related U.S. Application Data

[63] Continuation of Ser. No. 60,523, Aug. 13, 1970, abandoned.

[52] U.S. Cl............ 137/513.5, 47/48.5, 137/519.5, 137/533.11, 239/542
[51] Int. Cl............................................. F16k 15/04
[58] Field of Search ....... 47/48.5; 137/513.3, 513.5, 137/513.7, 519.5, 525, 533.11, 533.13, 533.15, 533.17, 533.19; 239/542

[56] References Cited
UNITED STATES PATENTS

| | | | |
|---|---|---|---|
| 3,481,310 | 12/1969 | Alburger | 137/525 X |
| 3,518,831 | 7/1970 | Tibbals et al. | 47/48.5 X |
| 3,547,355 | 12/1970 | Salazar | 137/525 X |
| 334,059 | 1/1886 | Tatum | 137/533.11 |
| 851,999 | 4/1907 | Skellenger | 137/513.5 |
| 1,011,797 | 12/1911 | Howell | 137/519.5 X |
| 2,091,058 | 8/1937 | Thompson et al. | 137/533.13 |
| 2,294,568 | 9/1942 | Nielsen | 137/533.15 X |
| 2,461,206 | 2/1949 | Fouse et al. | 137/513.3 X |
| 2,778,223 | 1/1957 | Kimbrell | 73/209 |
| 3,073,529 | 1/1963 | Baker | 137/513.5 X |
| 3,163,684 | 12/1964 | Gilbert | 137/533.11 X |
| 3,164,141 | 1/1965 | Jones | 137/513.5 X |
| 3,342,068 | 9/1967 | Metzger | 73/209 |

Primary Examiner—Martin P. Schwadron
Assistant Examiner—David J. Zobkiw
Attorney, Agent, or Firm—Paul A. Weilein

[57] ABSTRACT

A valve cage extending upward from a pressurized fluid source has a lower inlet valve seat and an upper outlet valve seat. Starting flow through the cage lifts a ball from the lower seat to close the upper seat but lifts the ball at only a moderate rate with a consequent prolonged initial purging of the valve cage and thereafter the outlet flow is through a minute recess in the upper valve seat.

5 Claims, 6 Drawing Figures

PATENTED OCT 15 1974　　　　　　　　　3,841,349

TRICKLE RATE FLUID OUTLET

This is a continuation of application Ser. No. 60,523, filed August 13, 1970, now abandoned.

BACKGROUND OF THE INVENTION

The invention fills the need for means to dispense a fluid at a minute rate and has special utility as an outlet fitting in a subterranean irrigation system. The following disclosure of an outlet fitting for such an underground irrigation system illustrates the principles underlying the invention and provides adequate guidance for those skilled in the art who may have occasion to apply the same principles to other specific purposes.

Ideally, an emitter fitting of this character for an underground water line of an irrigation system should meet a number of specific requirements. It should have a long service life with no need for frequently uncovering the fitting for inspection and therefore the fitting should be inherently reliable. To be reliable, the fitting should be of simple construction with few working parts and should be immune to clogging by corrosion, debris, algae, precipitated mineral deposits, and water-seeking roots. It should protect the water line itself from intrusion of troublesome foreign matter and in addition should prevent backflow or siphoning action in the water line. In addition, it is highly desirable that the fitting function in such manner that the whole water line is kept full of water for simultaneous initial discharge from all of the fittings along the line.

The underground fitting should release water at a trickle rate, for example at a rate of approximately one gallon per hour, and should do so over a wide range of pressures above 10 p.s.i. This low dispensing rate is desirable because providing the roots of plants 6–12 inches from the surface of the soil with a moderately low level of moisture is not only optimum for plant growth, but also eliminates surface evaporation to minimize weed growth. It has been further found that water of rather high salinity may be used at this low rate because plant roots tend to take up less salts if the soil moisture is maintained at the optimum level.

Finally, such a subterranean irrigation system should be of relatively low cost. The emitter fittings should be designed for mass production and the installation procedure should be simple with no need for special skills.

The broad object of the invention is to meet all of these requirements.

SUMMARY OF THE INVENTION

The fitting incorporates a check valve to minimize backflow and to discourage entrance of foreign material into the water line through the fitting. Although it is impossible to keep the fitting and the water line completely free from foreign material, nevertheless the same purpose may be achieved by providing an inherent self-cleaning action in the functioning of the fitting. Accordingly, the fitting is so designed that whenever the water is turned on there is a brief but highly effective initial flushing action at a relatively high rate of flow before the outlet flow is reduced to the desired trickle rate. Thus, the flushing action may be repeated for any desired number of cycles by merely opening and closing the main supply valve.

The preferred embodiment of the invention comprises an upright valve cage with a stainless steel ball therein that is free to move between a normal position in a lower inlet valve seat and an alternate position in an upper outlet valve seat. The ball is smaller in diameter than the inside diameter of the cage to permit effective flushing flow past the ball, but nevertheless the ball is of sufficient cross section to be lifted to the upper valve seat by the dynamic pressure of the initial flow and to be thereafter held in its upper closed position by the pressure differential across the ball as long as the valve cage remains in communication with the pressurized source.

When the ball is in the upper valve seat, discharge flow is restricted to a suitable minute by-pass that releases the water at the desired trickel rate. In the preferred practice of the invention the by-pass is simply a recess, notch or groove in the surface of the upper valve seat. A special advantage of such an arrangement is that the ball itself serves as one of the side walls of the by-pass and therefore the whole length of the by-pass is exposed for the initial flushing action that precedes the arrival of the ball at the upper valve seat. In addition, the turbulent flushing flow through the valve cage jiggles the ball against the inner surface of the cage to tend to jar loose any foreign material that may be in the by-pass recess or in the upper valve seat.

With reference to economy, the fitting may be made of inexpensive material and may be designed for quick and convenient assembly to a water line. In the disclosed embodiment of the invention, the water line is one-half inch plastic pipe made of polyethylene or the like and the inlet end of the fitting simply snaps into permanent engagement with a one-fourth inch hole in the wall of the pipe.

DESCRIPTION OF A PREFERRED EMBODIMENT OF THE INVENTION

Figure 1:
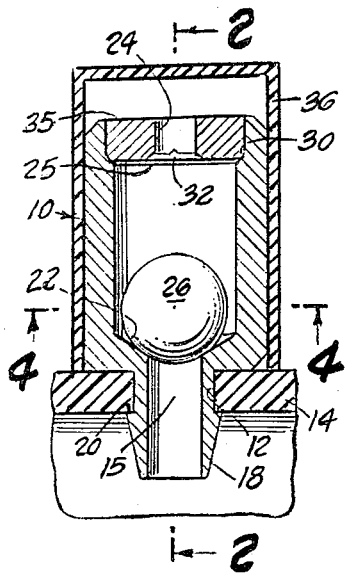
FIG. 1 is a sectional view of the presently preferred embodiment of the fitting with the steel ball in its normal position in the lower valve seat.

Referring first to FIG. 1, the embodiment of the invention selected for disclosure is a dispensing fitting in the form of a valve cage 10 that is adapted for mounting in a one-fourth inch hole 12 in a plastic pipe 14 that is buried in the ground from 6 to 12 inches below the surface. In the construction shown, the valve cage has an inlet port 15 in an axial extension of the valve cage, the axial extension having a tapered leading end 18 to facilitate insertion into the hole 12 and having an outer circumferential shoulder 20 to engage the inner surface of the plastic pipe for anchorage. The inlet port 15 of the valve cage is formed with a lower valve seat 22 and the upper end of the valve cage has an outlet port 24 that is formed with a similar valve seat 25.

A valve member for cooperation with the two valve seats may be of any suitable configuration and may be made of any suitable material. In the present embodiment of the invention the valve member is a stainless steel ball 26 which normally rests in the lower inlet valve seat 22 and which is of somewhat smaller diameter than the inside diameter of the cage to provide adequate clearance around the ball for the initial flushing action. Preferably, the cross sectional area of the clearance around the ball is greater than the cross sectional area of the inlet port 15 but the cross sectional area of the outlet port 24 is less than the cross sectional area of the inlet port for the purpose of creating relatively high flow velocity through the outlet port when the initial flushing action occurs. In this particular embodiment of the invention the inside diameter of the valve cage is approximately 0.370 inch; the diameter of the ball 26 is 5/16 inch; the inside diameter of the lower inlet port 15 is 11/64 inch; and the inside diameter of the upper outlet port 24 is one-eighth inch.

The valve cage 10 may be made of any suitable corrosion-resistant material such as brass or a suitable plastic and preferably the upper outlet port 24 is formed in a brass disc 28 that is dimensioned for a forced fit, the brass disc seating against an inner circumferential shoulder 30 of the cage. Preferably, the upper valve seat 25 is burnished and is spherically curved with a radius of curvature that is the same as the radius of the steel ball 26.

Figure 6:
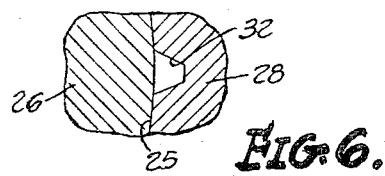
FIG. 6 is an enlarged fragmentary section along the line 6—6 of FIG. 5 showing the by-pass in transverse cross section.

Any suitable by-pass may be provided for release of the water at the desired restricted rate when the steel ball 26 is in the upper valve seat 25. In this particular embodiment of the invention the by-pass is simply a notch or groove in the upper valve seat 25 which is indicated by reference numeral 32 in FIG. 3. The by-pass may be simply a kerf with parallel side walls but preferably has divergent side walls as shown in FIG. 6, the cross sectional configuration of the by-pass being the configuration of a truncated triangle.

When the pipe 14 is cut off from the pressurized supply, the steel ball 26 is in its lower closed position in the lower valve seat 22 as shown in FIG. 1. It is to be noted that at this closed position the steel ball not only acts as a check valve to prevent reverse flow into the supply pipe, but also serves as a closure to keep any foreign material in the cage from dropping into the supply pipe.

Figure 2:
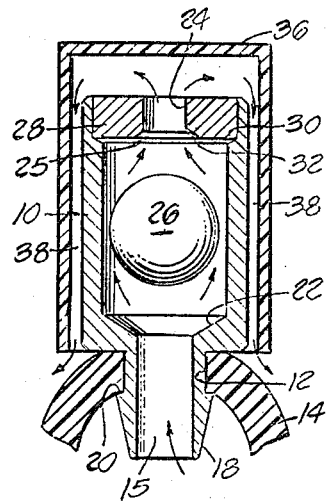
FIG. 2 is a sectional view taken on the line 2—2 of FIG. 1, showing the flushing action that occurs as the ball is lifted towards the upper valve seat.
Figure 3:
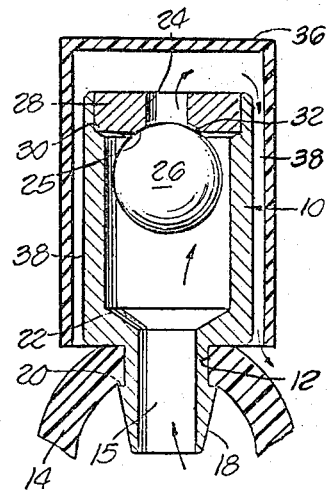
FIG. 3 is a similar view with the steel ball in the upper valve seat, the discharge flow being restricted to the minute by-pass.
Figure 4:
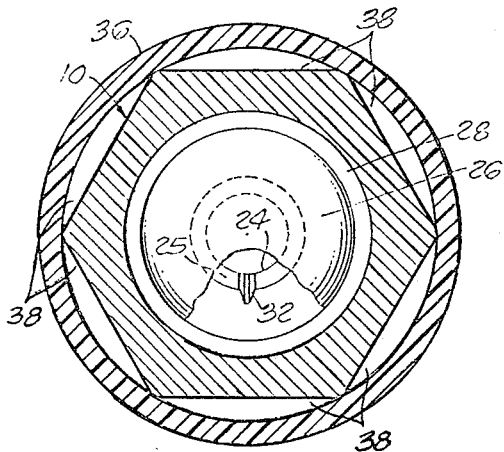
FIG. 4 is an enlarged transverse section along the line 4—4 of FIG. 1, with portions broken away to show the by-pass in the upper valve seat.
Figure 5:
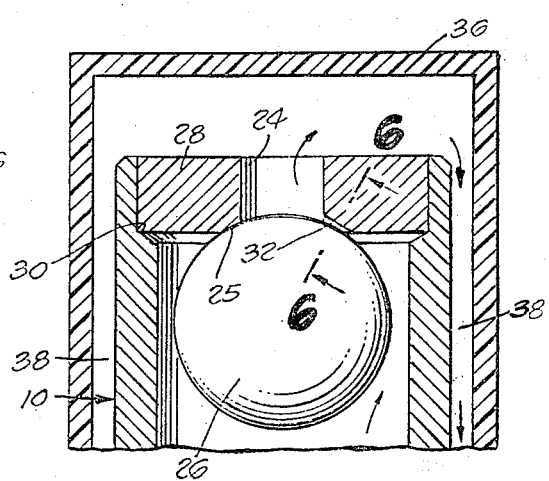
FIG. 5 is an enlarged sectional view showing the steel ball in the upper valve seat and showing how the upper valve seat is recessed to provide the desired minute by-pass.

When the supply valve is opened to place the pipe 14 under pressure, say a pressure in the range of 10–30 p.s.i., the steel ball 26 is lifted from the lower valve seat as shown in FIG. 2 and is carried to closed position in the upper valve seat as shown in FIG. 3. The steel ball is small enough in diameter relative to the inside diameter of the cage to permit the newly admitted water to flow around the ball as indicated by the arrows 34 in FIG. 2 but nevertheless the dynamic pressure against the underside of the ball is sufficient to cause the ball to move to its upper closed position.

The time it takes for the ball to reach its upper closed position is appreciable and is sufficient to prolong the initial flushing action to the desired extent. As a consequence of the flushing action, any foreign material that may be in the valve cage is swept out through the upper outlet port 24 and any foreign material that may be in the upper outlet port or in the by-pass recess 32 is also swept out by the local increase in velocity of the flushing flow. It is to be noted that since the steel ball itself forms one wall of the by-pass 32 when the steel ball is in its upper closed position, the steel ball provides one of the side walls of the by-pass and thus permits the whole length of the by-pass to be exposed to the flushing action prior to the arrival of the steel ball at its upper closed position.

Once the steel ball reaches its upper closed position it is held in place by the pressure differential across the steel ball and the steel ball will remain in its upper closed position even though the pressure inside the cage may drop to 1 or 2 p.s.i. As long as the ball remains at its upper closed position with the interior of the valve cage in communication with the pressurized source, the discharge from the fitting is restricted to the rate of flow through the by-pass 32 which is a trickle rate that, for example, may be approximately 1 gallon per hour.

When the pipe 14 is cut off from the pressurized source, the interior of the cage drops to atmospheric pressure and the steel ball gravitates to its normal lower closed position.

Based on the above recited dimensions, the cross sectional area of the inlet port is 0.0232 square inch; the cross sectional area of the clearance around the ball is 0.0308 square inch; the cross sectional area of the outlet port is 0.0123 square inch; and the diameter of the ball is approximately 84 percent of the inside diameter of the valve cage.

Figure 7:
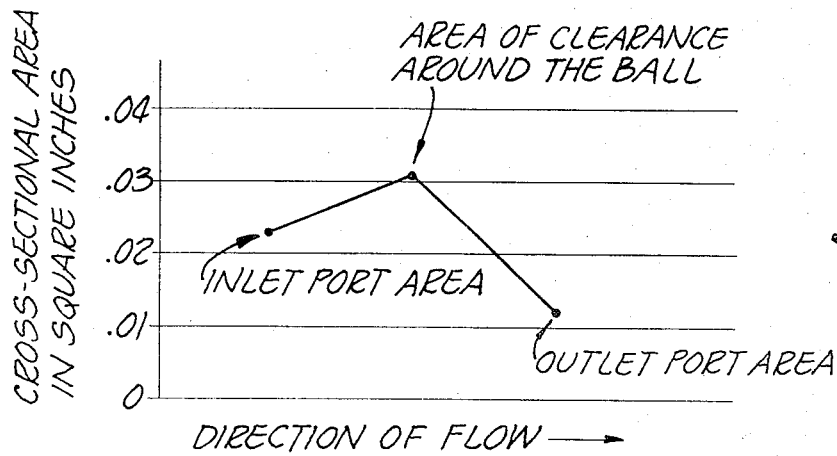
FIG. 7 is a diagram indicating the changes in cross sectional area of the passage of the valve cage through which the water flows.

FIG 7 indicates graphically that the cross sectional area of the clearance around the ball exceeds the cross sectional area of the inlet port and the cross sectional area of the outlet port is less than the cross sectional area of the clearance around the ball and is also less than the cross sectional area of the inlet port. Using these dimensional relationships results in adequate clearance around the ball for water to rush around the ball to flush out the valve cage before the ball reaches the upper seat, the water flowing faster than the ball moves and flowing around and ahead of the ball for the flushing action as the flowing water lifts the ball to the upper valve seat. Thus, the flowing water lifts the ball at a slow enough rate to permit the desired initial flushing action before the ball seats.

Providing a cross sectional area around the ball that is greater than the cross sectional area of the inlet port assures that the pressure will not drop between the inlet and the outlet ports, i.e., keeps the ball from unduly restricting the flow through the valve cage. It is to be borne in mind that it is of the utmost importance to thoroughly flush out the notch in the upper valve seat and high velocity flow through the upper valve seat is required for this purpose. With the liberal clearance around the ball preventing any significant pressure drop at the ball, the pressure of the outlet port is relatively high with a consequent relatively high pressure differential across the outlet port to create the effective flushing action in the region of the outlet port notch.

Figure 8:
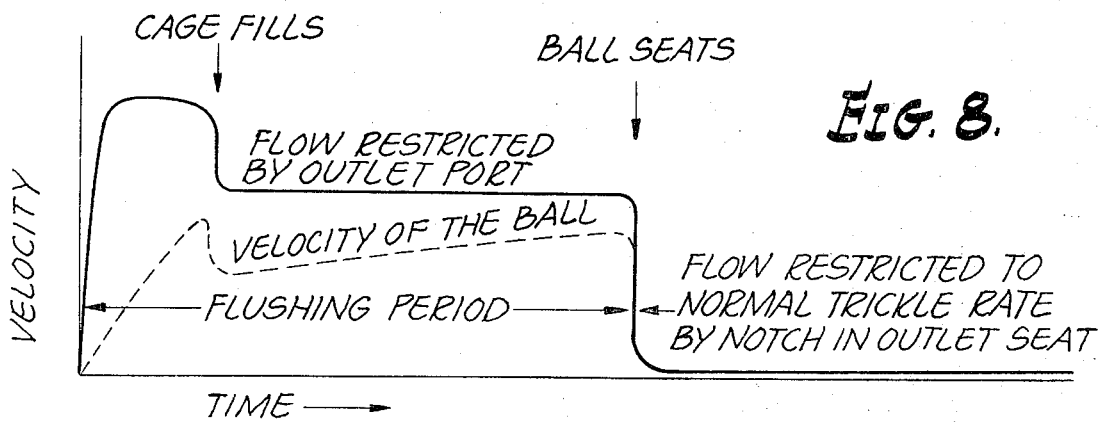
FIG. 8 is a diagram indicating the changes in velocity of the water flow through the valve cage during the initial flushing period and also indicating the velocity of movement of the ball member.

In FIG. 8 velocity is plotted against time to indicate the character of the initial flow through the valve cage that carries out the flushing action. Since there is freedom for liberal flow past the ball, the cage fills with water while the ball is moving upward and the filling of the cage drops the velocity of water flow to a rate determined by the cross sectional area of the outlet port. There follows a period of somewhat reduced flow velocity during which the ball is lifted to the upper valve seat and during this period the flushing action is continued until the moment when the ball is fully seated. It is apparent that the effective self-cleaning action of the valve depends upon the dimensional relationship shown in FIG. 7.

Figure 9:
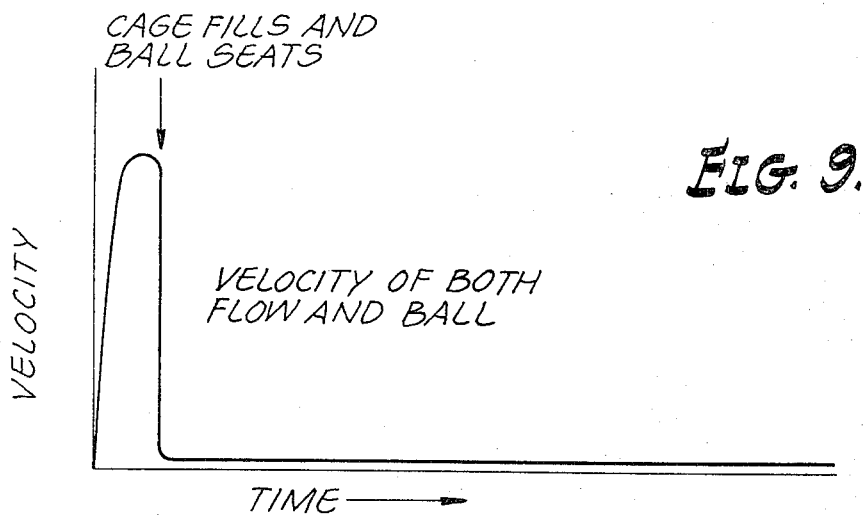
FIG. 9 is a diagram similar to FIG. 8 showing the result of making certain changes in the dimensions of the water passage through the valve cage.

If the cross sectional area of the clearance around the ball were substantially less than the cross sectional area of the inlet port, the ball would unduly restrict the water flow and consequently would function more or less like a piston with relatively little water flow past the valve. Accordingly, the ball would snap to its upper closed position prematurely to prevent the desired prolonged flushing action. FIG. 9 illustrates this result in which high velocity water flow through the valve cage is limited to an exceedingly short time period because the cross-sectional area of the clearance around the ball permits relatively little flow past the ball as required for the flushing action.

On the other hand, if the cross sectional area of the clearance around the ball greatly exceeds the cross sectional area of the inlet port, water flows too freely past the ball to prolong unduly the flushing out of the valve cage. One consequence is waste of water in the system where it is the intention to supply the water at only a trickle rate and another undesirable consequence is undue disturbance of the soil by the violent subterranean discharge of the water. In fact, if the clearance around the ball is greatly increased relative to the cross sectional area of the inlet port, the ball may fail to reach the upper valve seat.

Since the described structure is employed underground, it is desirable to add a cylindrical cap 36 which telescopes over the valve cage and forms with the valve cage at least one discharge passage from the outlet port 24 to a relatively low point on the exterior of the valve cage but it is to be understood that the cap may be omitted when the device is used for other purposes. In the construction shown, the cylindrical cap 36 is made of a suitable plastic and the cap embraces the valve cage sufficiently tightly to keep the cap from being lifted away from the valve cage by the flushing action.

In this particular embodiment of the invention the outer surface of the valve cage is of hexagonal configuration so that the cylindrical cap cooperates with the valve cage to form six narrow discharge passages 38 along the exterior of the valve cage. These passages tend to be free from foreign material not only because the passages extend downwardly, but also because the flushing flow through the passages is at relatively high velocity. Since the discharge passages 38 open downwardly, foreign material does not gravitate into the passages from the surrounding soil and since the discharge passages are not only relatively narrow but are also relatively long and open downwardly, there is practically no tendency for any fine roots to extend upwardly into the passages to clog the discharge flow. It is also to be noted that with the cylindrical cap 36 positioned in the path of the outlet port 24 and with the cylindrical cap distributing the outlet flow into six discharge channels, the flushing action of the valve does not tend to disturb the surrounding soil to any significant degree. Thus, the cylindrical cap serves, in effect, as a muffler for the flushing flow.

In the described embodiment of the invention the valve member is biased by gravity to its closed position and the valve cage is positioned upright for this purpose. It is obvious, however, that the valve member may be biased to its normal closed position by spring pressure and that the valve cage need not be in upright position. For this reason and other reasons the invention may take various forms within the scope of the appended claims.

I claim:

1. In a device of the character described for releasing a fluid from a pressurized source at a low rate, the combination of:
    an upright valve cage having an inner wall forming an upright passage for fluid flow therethrough with an inlet port at the bottom end of the passage to receive fluid from the source and an outlet port at the upper end of the passage,
    each of said ports being formed with an inner valve seat; and
    a valve member in said passage to seat in the two valve seats alternately,
    said valve member being biased gravitationally towards said inlet seat,
    said valve member being smaller in cross section than the cross section of the passage to permit initial fluid flow through the passage to sweep past the valve member,
    said valve member being of a cross section to respond to the dynamic pressure of the fluid flowing through the passage to move to the valve seat of the outlet port in response to rise in the rate of the fluid flow,
    whereby placing the inlet port in communication with the pressurized source results, first, in unseating of the valve member to open the inlet port, second, initial fluid flow past the valve member to flush out the valve cage, third, movement of the valve member into the valve seat of the outlet port and, fourth, retention of the valve member in the seat of the outlet port by the pressure differential across the outlet port as long as the cage remains in commination with the pressurized source,
    said valve cage having a minute passage by-passing the seat in the outlet port for discharge flow from the cage when the valve member is seated in the valve seat of the outlet port; and
    means defining at least one discharge passage having a portion spaced radially outward from the inner circumferential surface of the valve cage, said discharge passage leading downwardly from the outlet port and the by-pass passage.

2. A combination as set forth in claim 1 in which the valve member is a ball and the cross-sectional area of the clearance between said ball and the inner wall of the cage is greater than the cross-sectional area of said inlet port.

3. A combination as set forth in claim 1 in which said mass includes a cap fitting over the upper end of the cage and cooperating with the cage to define said discharge passage.

4. A combination as set forth in claim 3 in which said cage is of polygonal outer cross-sectional configuration and said cap has a cylindrical wall embracing the cage to form therewith a plurality of downwardly extending discharge passages.

5. A combination as set forth in claim 4 in which said cap is made of plastic.

* * * * *